(No Model.) 3 Sheets—Sheet 1.

P. E. ESTABLIE.
VESSEL FOR PRESERVING MEATS, &c.

No. 370,250. Patented Sept. 20, 1887.

Fig. 1ᵃ

Fig. 1ᵇ

WITNESSES:
E. B. Bolton
J. S. Caplinger

INVENTOR:
Pierre Emile Establie
By Henry Connett
Attorney.

(No Model.) 3 Sheets—Sheet 2.

P. E. ESTABLIE.
VESSEL FOR PRESERVING MEATS, &c.

No. 370,250. Patented Sept. 20, 1887.

WITNESSES:

INVENTOR:
Pierre Emile Establie.
By Henry Connett
Attorney.

(No Model.) 3 Sheets—Sheet 3.

P. E. ESTABLIE.
VESSEL FOR PRESERVING MEATS, &c.

No. 370,250. Patented Sept. 20, 1887.

WITNESSES:

INVENTOR:
Pierre Emile Establie,
By his Attorney,

United States Patent Office.

PIERRE EMILE ESTABLIE, OF PARIS, FRANCE.

VESSEL FOR PRESERVING MEATS, &c.

SPECIFICATION forming part of Letters Patent No. 370,250, dated September 20, 1887.

Application filed April 18, 1887. Serial No. 235,175. (No model.)

*To all whom it may concern:*

Be it known that I, PIERRE EMILE ESTABLIE, a citizen of the French Republic, and a resident of Paris, France, have invented certain Improvements in Vessels for Preserving Meat, Fresh Fish, and other Comestibles, of which the following is a specification.

My invention relates to that class of vessels for preserving substances—such as meat and fresh fish, for example—wherein the preserving is effected by forcing water into the vessel after the substance has been placed therein, in order to expel the air. I do not claim this process or method of preserving, as I am not the inventor thereof; but the object and purpose of my present invention is to improve the vessel or can, so as to better adapt it for use by this method of preserving.

My invention will be fully described hereinafter, and its novel features carefully defined in the claims.

Figure 1:
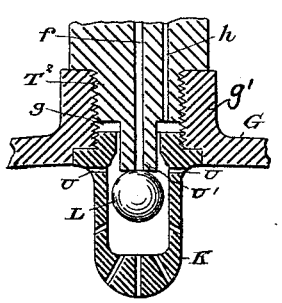
Figure 1:
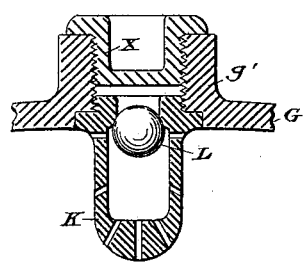
Figure 1:
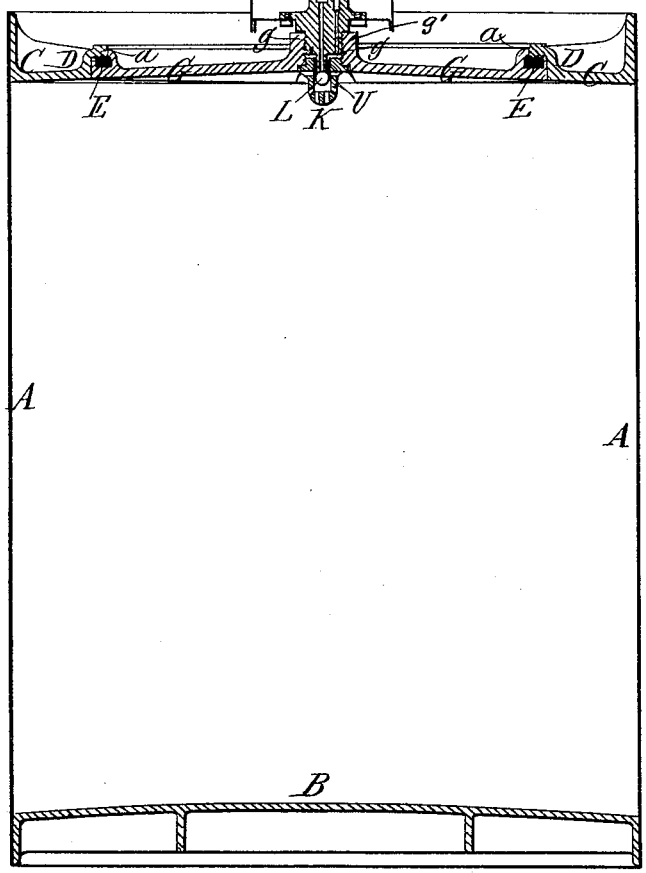
Figure 3:
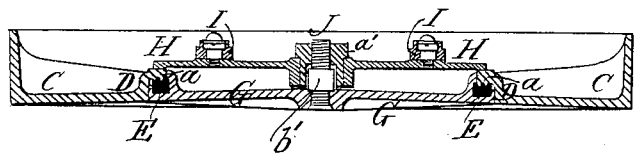
Figure 2:
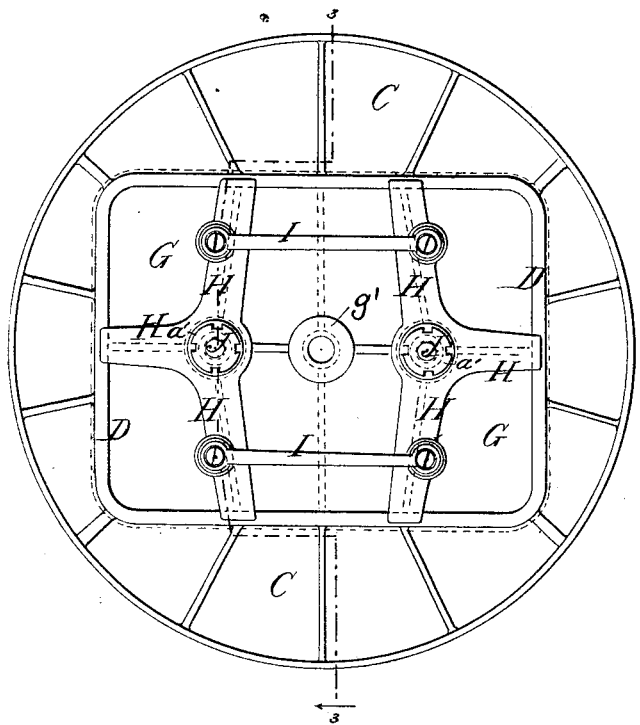
Figure 4:
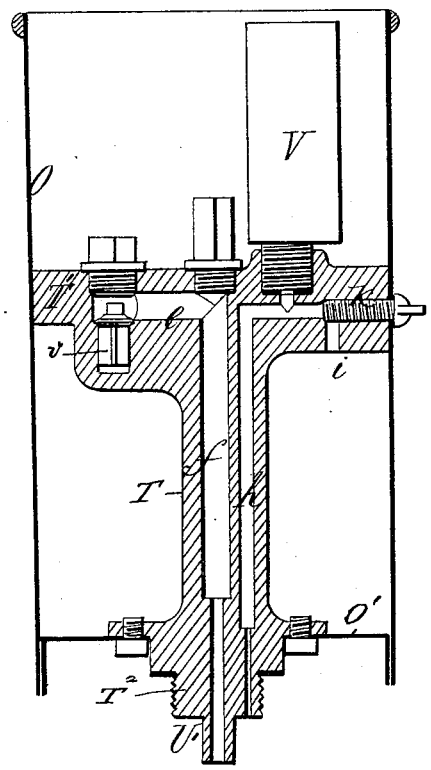
Figure 5:
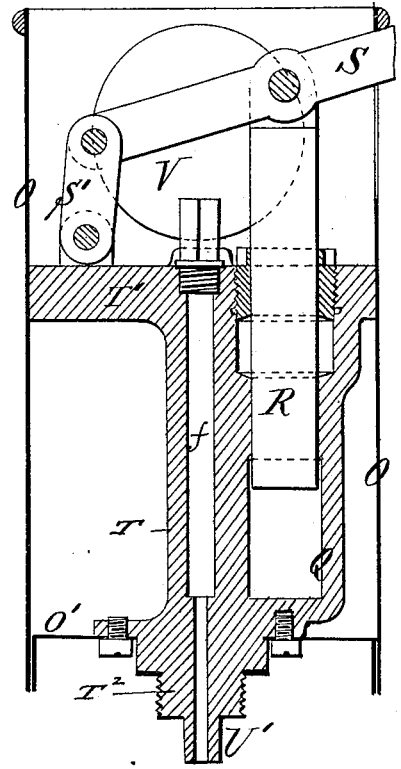
Figure 6:
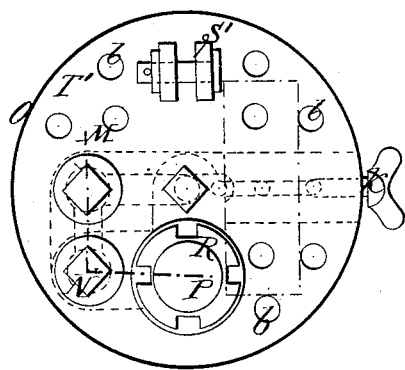
Figure 7:
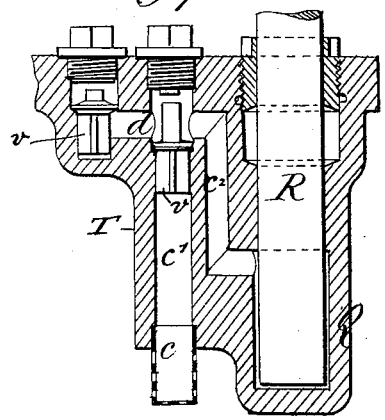

In the drawings which serve to illustrate my invention, Figure 1 is a vertical axial section of a can or vessel embodying my invention and of the pump for forcing water into the same. Figs. 1$^a$ and 1$^b$ are detached sectional views on a larger scale than Fig. 1, illustrating details of construction, that will be hereinafter described. Fig. 2 is a plan of the top or filling end of the vessel, the pump not being shown in this case. Fig. 3 is a transverse section of the end or head of the vessel seen in Fig. 2, the section being taken substantially on line 3 3 in Fig. 2, so as to show the mounting of the three-armed lever H. These figures (2 and 3) show the head of the cylindrical vessel only. Figs. 4 and 5 are vertical axial sections of the force-pump on a scale about double that of Fig. 1. The planes of these sections are at right angles. Fig. 6 is a plan of the pump. The pump handle and plunger are not shown in this view, and the manometer is indicated in dotted lines. Fig. 7 is a section developed on the plane indicated by line M N P in Fig. 6.

In order to withstand the desired internal pressure, I construct my can or vessel very strong and tight.

A is the cylindrical body of the vessel, constructed of sheet-steel tinned or galvanized. When the body has been formed and riveted, and the heads have been placed and riveted fast, I re-tin or galvanize the whole structure, thus insuring tightness of the joints.

B is the bottom head, which is made strong by giving its inner face a convex form, and by forming ribs on its outer face.

C is the top head, which is constructed in a similar manner, except that it has formed in it an oblong rectangular filling-aperture. Around the margin of this aperture is formed a rabbet-flange, D, the recess of the rabbet being on the inner or under side of the head.

G is the cover, which serves to close the filling-aperture, and which is made to fit into said rabbet. Around the margin of cover G, on its upper face, is formed a groove, in which is fitted a packing-ring, E, of rubber, leather, or other suitable packing material. In order to insure a perfectly-tight joint, I prefer to form slight continuous ribs $a$ $a$ on the face of the rabbet D. These ribs sink into the packing when the can is closed. The cover being oblong, it may be conveniently passed through the filling-aperture in head C, and then turned around until it enters the rabbet properly.

Figs. 2 and 3 illustrate the means employed for securing the cover G in place. H H are two three-armed levers pivotally mounted on the cover at J J, respectively, and connected by parallel links I I, so that when one is turned on its pivot the other will move with it. The arms of the levers H extend out far enough to take over the rabbet-flange or "coaming" D around the filling-aperture when they stand in the position seen in Fig. 2; but when these levers are turned a little on their pivotal points or centers J the arms will draw in, so as to clear the margin of the opening. After the cover is in place and the levers H turned until their arms stand as in Figs. 2 and 3, the nuts $a'$, which have shoulders that take over the levers at their pivotal points, may be screwed down a little on screws $b'$, and this will have the effect of pressing the packing up firmly against its seat. The screw $b'$ (seen best in Fig. 3) is screwed and riveted into cover G, and the cup-like or tubular nut $a'$ screws onto this screw and provides a bearing for lever H.

The cover G is made concave on its under side, and this permits or compels the air in the vessel to collect finally under the center of said cover, where it escapes during the filling of the can with water under pressure. This construction effectually prevents the incarceration of air in the vessel.

In the center of the cover G, on the outer or upper side, is a boss, $g'$, and through this boss is a screw-threaded aperture. A valve-box or cage, K, is screwed into this aperture from the under side of the cover, and in this box is placed a ball-valve, L. The valve-box has perforations in its lower part for the passage of water into the vessel, and other perforations, U, close up to the cover G, for the escape of air. Fig. 1ª shows this construction most clearly.

Referring to Figs. 4, 5, 6, and 7 particularly, I will now describe the pump employed for forcing water into the vessel, said pump being also so constructed as to permit the escape of air from the vessel while the water is forced in.

O is a cylinder of sheet metal, and O′ is a bottom in same, the two forming a sort of receptacle. In this receptacle is mounted and secured a cast-metal pump-body, T, the upper plate, T′, of said body being circular and fitting into the cylinder O.

Q is the pump-barrel; R, the pump-plunger, and S the pump handle or lever coupled to plate T′ by a link, S′. Water is poured into the receptacle O O′ and flows through holes $b$ in plate T′ into the bottom thereof. The water is taken up by the pump through a strainer, $c$, (see Fig. 7,) and passages $c'$ $c^2$, and is forced out through passages $c^2$, $d$, $e$, and $f$ to the preserving-vessel.

$v$ $v$ are the pump-valves, which operate in the usual way. The outlet-passage $f$ extends through a screw-threaded spud, $T^2$, which fits and screws into the boss $g'$ on the cover G of the preserving-vessel, leaving, however, an open space, $g$, under it, as seen best in Fig. 1ª. On the spud $T^2$ is a slender nipple, U′, which passes down into the valve-box K and keeps the ball-valve L pushed down off from its seat, which is in the upper part of said box above the air-inlet U.

In the pump-body T and spud $T^2$ is formed an air-passage, $h$, which connects at its inner lower end with the space $g$ in boss $g'$ and with an outlet, $i$. (Seen in Fig. 4.) A screw-plug, $k$, (seen also in this figure,) serves to close the outlet at will.

I will now describe the operation of filling the preserving-vessel. The substance to be preserved is first placed in the vessel, measurably filling the same, but leaving interstices containing air. The cover G is now placed on the vessel and made fast, and the force-pump is then mounted on said cover by screwing spud $T^2$ down tightly into the boss $g'$. Water is placed in the receptacle O O′ and the pump set in operation. The water passes into the preserving-vessel through passage $f$ and expels the air, which rises and passes out through perforations U, around nipple U′, into space $g$, and thence by way of passage $h$ to outlet $i$, which must be left open. The concave form of cover G permits the water to drive the last vestige of air to the outlets U, which are at the highest part of the vessel's interior. When the air has all been driven out, water will follow and appear at outlet $i$. When this occurs, screw $k$ is driven in to close outlet $i$, and the pumping is continued until the proper or desired internal pressure shall have been reached, which will be indicated on an ordinary manometer or pressure-gage, V, open to some part of passage $h$. The pump is now disengaged by unscrewing spud $T^2$ from boss $g'$, when the ball-valve will follow up the receding nipple U′ to its seat and close the vessel against the escape of the water or any portion thereof. After the pump has been removed, the permanent closing of the vessel may be effected by screwing a screw-plug, X, into the boss $g'$, to occupy the place before occupied by spud $T^2$. This position of the parts is illustrated in Fig. 1ᵇ.

I have omitted from Fig. 1 the levers H and links I, in order to avoid obscuring the other parts which this view is designed to illustrate.

Having thus described my invention, I claim—

1. The combination, with the concave filling-head of the vessel having an oblong filling-aperture, provided with a marginal rabbet on its inner face to receive the cover, of the cover made concave on its inner face and provided with an aperture for the escape of air at its center and means, substantially as described, for securing the cover when placed, substantially as set forth.

2. The combination, with the head C of the vessel having an oblong filling-aperture and a marginal rabbet on its inner face to receive the cover, of the cover G, provided with the levers H H, pivotally mounted on it and connected by a link or links, I, substantially as and for the purposes set forth.

3. The combination, with the cover G, of the screw $b'$, secured in it, the flanged nut $a'$, screwed onto screw $b'$, and the lever H, mounted rotatively on said nut as an axis, substantially as and for the purposes set forth.

4. The combination, with the preserving-vessel provided with a filling-aperture in one of its heads, of the cover G for this aperture, made concave or arched on its under side and provided with a boss, $g'$, having a screw-threaded bore to receive a force-pump, and a valve-box, K, and valve L, said valve-box being screwed into said cover from its under side, and having perforations near the cover for the escape of air from the vessel, and apertures for the passage of water into the vessel, substantially as set forth.

In witness whereof I have hereunto signed my name in the presence of two subscribing witnesses.

PIERRE EMILE ESTABLIE.

Witnesses:
ROBT. M. HOOPER,
AMAND RITTER.